United States Patent [19]

Marsh et al.

[11] Patent Number: 5,487,145
[45] Date of Patent: Jan. 23, 1996

[54] METHOD AND APPARATUS FOR COMPOSITING DISPLAY ITEMS WHICH MINIMIZES LOCKED DRAWING AREAS

[75] Inventors: Donald M. Marsh, Mountain View; Jeff Zias, Santa Clara, both of Calif.

[73] Assignee: Taligent, Inc., Cupertino, Calif.

[21] Appl. No.: 89,924

[22] Filed: Jul. 9, 1993

[51] Int. Cl.$^6$ ........................................................... G06F 9/34
[52] U.S. Cl. ........................................................... 395/162
[58] Field of Search ........................... 395/122, 133–135, 395/138, 153–160, 162–166, 200, 425, 650

[56] References Cited

U.S. PATENT DOCUMENTS

| | | | |
|---|---|---|---|
| 4,779,081 | 10/1988 | Nakayama | 340/721 |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,914,607 | 4/1990 | Takanashi et al. | 364/521 |
| 4,953,080 | 8/1990 | Dysart et al. | 364/200 |
| 4,954,818 | 9/1990 | Nakane | 340/721 |
| 4,954,819 | 9/1990 | Watkins | 340/721 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,146,555 | 9/1992 | Kiyohara | 395/157 |
| 5,151,987 | 9/1992 | Abraham et al. | 395/575 |
| 5,181,162 | 1/1993 | Smith et al. | 364/419 |
| 5,216,413 | 6/1993 | Seiler et al. | 395/164 |
| 5,237,653 | 8/1993 | Noguchi et al. | 395/158 |
| 5,265,202 | 11/1993 | Krueger et al. | 395/158 |

FOREIGN PATENT DOCUMENTS

| | | |
|---|---|---|
| 223557 | 5/1987 | European Pat. Off. . |
| 462565 | 12/1991 | European Pat. Off. . |

OTHER PUBLICATIONS

Turbo® C$^{++}$, Version 3.0, User's Guide, Borland International, 1992.
MacDraw Pro User's Guide ©1991 Claris Corp. pp. 3–20 to 3–28.
Hewlett–Packard Journal, v. 40(6) Dec. 1989, Palo Alto, US pp. 20–32 J. R. Boynton et al. "Sharing Access to Display Resources in the Starbase/XII Merge System".
IBM Technical Disclosure Bulletin, V. 30(11), Apr. 1988, New York, US, pp. 268–270 "Transparent Window Selection".
Patent Abstracts of Japan, V. 15(214)(P–1209) May 31, 1991 & JP,A,03 059 719 Mar. 14, 1991.
IBM Technical Disclosure Bulletin, V. 24(10), Mar. 1982, New York, US, pp. 5199–5200 "Font for Plasma Displays".

*Primary Examiner*—Mark R. Powell
*Assistant Examiner*—U. Chavhan
*Attorney, Agent, or Firm*—Keith Stephens

[57] ABSTRACT

A compositing architecture provides for correct rendering of overlapping opaque and translucent regions of respective graphic images with rapid pixel restoration when an image floating above another image is moved or manipulated to reveal pixels of a graphic image at a greater depth by provision for buffering data corresponding to a portion of a graphic image which is beneath another graphic image. Data representing graphic images is selectively routed to a painter in response to a determination of opacity and depth order of the graphic images. A plurality of painters are preferably provided with image rendering pipeline of differing lengths. A painter is chosen in accordance with the number of images to be composited. Data buffering is minimized by dynamic creation and removal of buffers in accordance with the intersecting regions of the graphic images.

15 Claims, 8 Drawing Sheets

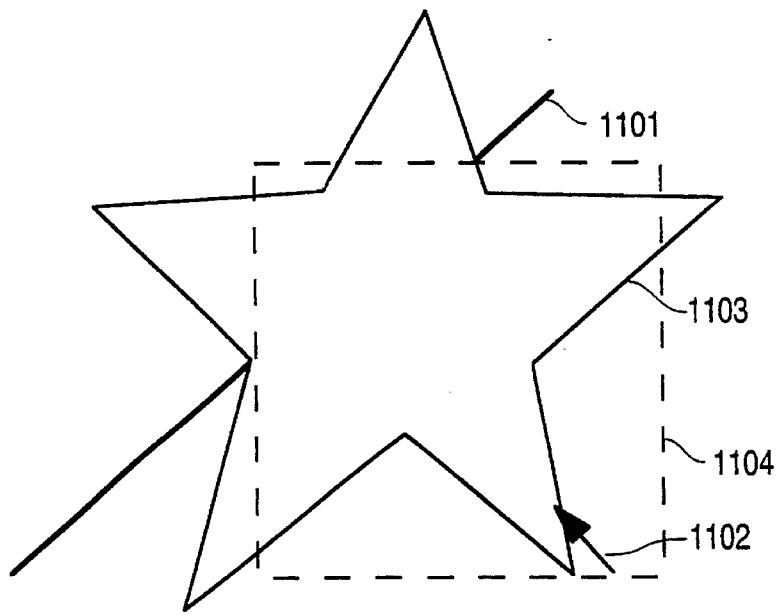
FIG. 11
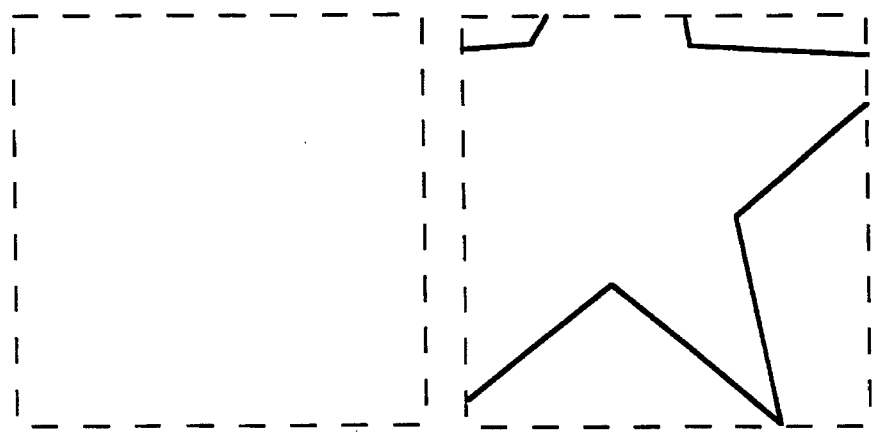
FIG. 12A     FIG. 12B
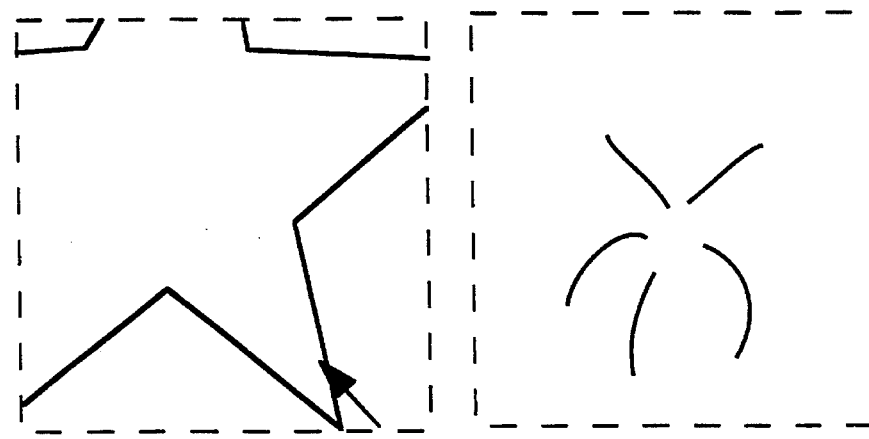
FIG. 12C     FIG. 12D

METHOD AND APPARATUS FOR COMPOSITING DISPLAY ITEMS WHICH MINIMIZES LOCKED DRAWING AREAS

BACKGROUND OF THE INVENTION

1. Field of the Invention

The present invention generally relates to computer image generation for display to a user and, more particularly, to an architecture for a compositing subsystem for rendering images of opaque, translucent, transparent or semi-transparent items or objects which may be overlaid on the same display space, especially where the screen is shared by multiple tasks in a multi-tasking environment.

2. Description of the Prior Art

It has long been recognized that visual displays are much preferred for a communication interface between a data processing device or system and an operator. Visual displays provide the operator with confirmation of input actions as well as appropriate input options and instructions, often in the form of icons and/or menus and to exert control over plural applications which may be run concurrently on the data processing system, such as in a multi-tasking environment.

Visual displays have become fairly sophisticated with various display attributes used to enhance communication with a user. Color icons and animation have been used to enhance visibility and indicate both cursor function and identity (e.g. the input device controlling the cursor) as well as system function. The appearance of the visual display, including various display features which may be provided, is a major factor in the "look and feel" of particular data processing applications. By the same token, the appearance of the display, particularly as it is changed in response to user commands or system function or operation is a major factor in user confidence and satisfaction with both the data processing system and applications run on it.

Utilization of multiple display features by one or more applications also calls for an order to be observed in their presentation (often referred to as "compositing", at the level of display screen image generation) to achieve appropriate rendering of each image portion. For example, in a windowing display environment, an order must be established between displayed, overlapping windows so that data being manipulated in one active window is not obscured by objects associated with another window. Menus, at least in the active window, should not be obscured. Cursors must not be obscured by the data on which they operate but, except for a so-called main cursor, may be covered by windows or menus. Sprites may be used both as cursors and application level objects, such as icons (with or without animation) with corresponding visibility requirements.

Additional complexity in ordering results windows which are often used in multi-tasking environments. Windows, themselves, may be regarded as either opaque or transparent. Further, if graphics applications are run in any window, that window may display many objects in many colors (as well as cursors, menus and other display features) which may overlap (e.g. occult each other in various combinations and orders) and which may also have various degrees of opacity or transparency (e.g. translucency) as well as color, pattern, texture, intensity, animation and other display attributes.

Another complexity derives from the expected behavior of display image features. For example, pop-up features such as help windows or balloons and pull-down menus are generally stationary within a window but are expected to appear and disappear from a window almost instantaneously and without leaving artifacts such as blank spaces or obsolete images (e.g. if the image of an object should have been changed while obscured by another images). Images of graphic objects may be dragged from one location to another or be distorted or changed in size by dragging a handle of a border, corner or some other portion of the object and portions of objects or background which have been obscured should immediately reappear, correctly rendered, when the object no longer occults them. Similarly, images of three-dimensional objects may also be rotated in space so that the projection in the plane of the screen may cause the displayed boundary of the object to change. While users do not generally object to the time required for redrawing a screen when an object is added to or deleted from a screen or window, immediate response is expected during many other user interactions with the data processing system.

Display generation is a computationally intensive process in view of the number of pixels to be controlled at high resolution of color, intensity and hue and the number of objects, display features and screens and interactions therebetween which must be supported. Therefore, display generation is usually very expensive in processing time and image data storage. Therefore, buffering of all objects and display features (even though obscured in the final image) does not provide a viable solution to rapid response time of the display. Such potentially massive storage requirements require significant processing time for management and access.

Further, full generality of rendering expands computation time exponentially with the number of layers of data which must be considered in developing the correct pixel image values for control of the display device since each underlying layer can potentially affect the rendering of all layers above it. That is, the compositing process must support simulation of the effects of overlaying of semi-transparent colored filters so that a display may be formed of opaque or semi-transparent shapes that may appear to float over and under each other without flickering or impairing rendering of graphics beneath them. To date, even modest levels of generality of compositing have required substantial hardware provision or such amounts of image processing time as to place sophisticated image processing within acceptable time constraints beyond the capacity of all but the largest of data processing systems.

SUMMARY OF THE INVENTION

It is therefore an object of the present invention to provide an architecture for an image compositing subsystem which will allow efficient composition of a large plurality of windows, objects and screen features at high speed and which may be made to appear to float over each other.

It is another object of the present invention to provide an image compositing subsystem architecture which will support correct, flexible rendering of a plurality of opaque and semi-transparent objects and screen features, hereinafter collectively referred to as "items".

It is a further object of the present invention to provide a compositing subsystem and method of increased generality which may be implemented with reduced hardware and resulting in display generation in reduced response time.

It is a yet further object of the invention to provide for substantially immediate response with current image items and freedom from rendering artifacts.

In order to accomplish these and other objects of the invention, a method for rendering a plurality of graphic images which may intersect in a region of a display of a data processing system is provided, comprising the steps of dividing the plurality of graphic images into groups, each group having a level and each image in a group having a level within its group, testing images in a group containing an active image for intersection with that active image, including testing the group containing an active image against other groups to determine groups which cannot contain an intersecting image, and intercepting image data from a lower level image when intersection is detected.

In accordance with another aspect of the invention, an image compositing method is provided comprising the steps of generating image data corresponding to each of a plurality of items, each item having a level, detecting intersections of respective items, intercepting image data corresponding to an item having a comparatively lower level, and redirecting intercepted image data to at least one of a buffer and a dynamically selected painter.

In accordance with a further aspect of the invention, a method for displaying graphic images which may overlap is provided, including the steps of detecting a depth order of overlapping portions of the graphic images, selectively directing data representing said graphic images to a painter in response to detection of depth order, and storing in a beneath buffer at least one overlapped portion of at least one graphic image having a depth which is greater than a depth of a portion of another graphic image which occults the overlapped portion of said at least one graphic image.

In accordance with yet another aspect of the invention, a method for rendering graphic images on a display is provided including the steps of generating image values based on an ordered plurality image data, the image data being ordered in accordance with relative depth layers of at least two graphic images, and storing in a beneath buffer at least one overlapped portion of at least one graphic image having a depth which is greater than a depth of a portion of another of said graphic images which occults said at least one overlapped portion of said at least one graphic image.

In accordance with another further aspect of the invention, a display compositing method is provided including the steps of forming a plurality of beneath buffers for storing data representing respective graphic images, grouping the beneath buffers in accordance with depths of windows in which they may appear, forming a pointer from at least one group to each beneath buffer it contains, forming a pointer to the next group at a lesser depth, and forming a pointer to each group which contains data representing a graphic image which may intersect with an image in the at least one group.

In accordance with another further aspect of the invention, a display method is provided including the steps of moving at least one window on a display, freezing drawing activity on said display in response to the moving of a window on the display, and buffering at least one area on said display.

In accordance with a yet further aspect of the invention, a compositing display method is provided comprising the steps of requesting a drawing lock for a screen region bounding an object to be displayed, checking the screen region for composited items, granting a drawing lock for a first region of the screen region which contains only a single combination of one or more objects, calling a painter corresponding to the single combination of one or more objects and releasing the drawing lock.

BRIEF DESCRIPTION OF THE DRAWINGS

The foregoing and other objects, aspects and advantages will be better understood from the following detailed description of a preferred embodiment of the invention with reference to the drawings, in which:

FIG. 11 is a pictorial representation showing two opaque composited items intersecting in an active drawing in accordance with a preferred embodiment; and FIGS. 12A, 12B, 12C and 12D are pictorial representations of the buffer creation and deletion processes implemented by the invention in generating the display shown in FIG. 11 in accordance with a preferred embodiment.

DETAILED DESCRIPTION OF A PREFERRED EMBODIMENT OF THE INVENTION

Figure 1A:
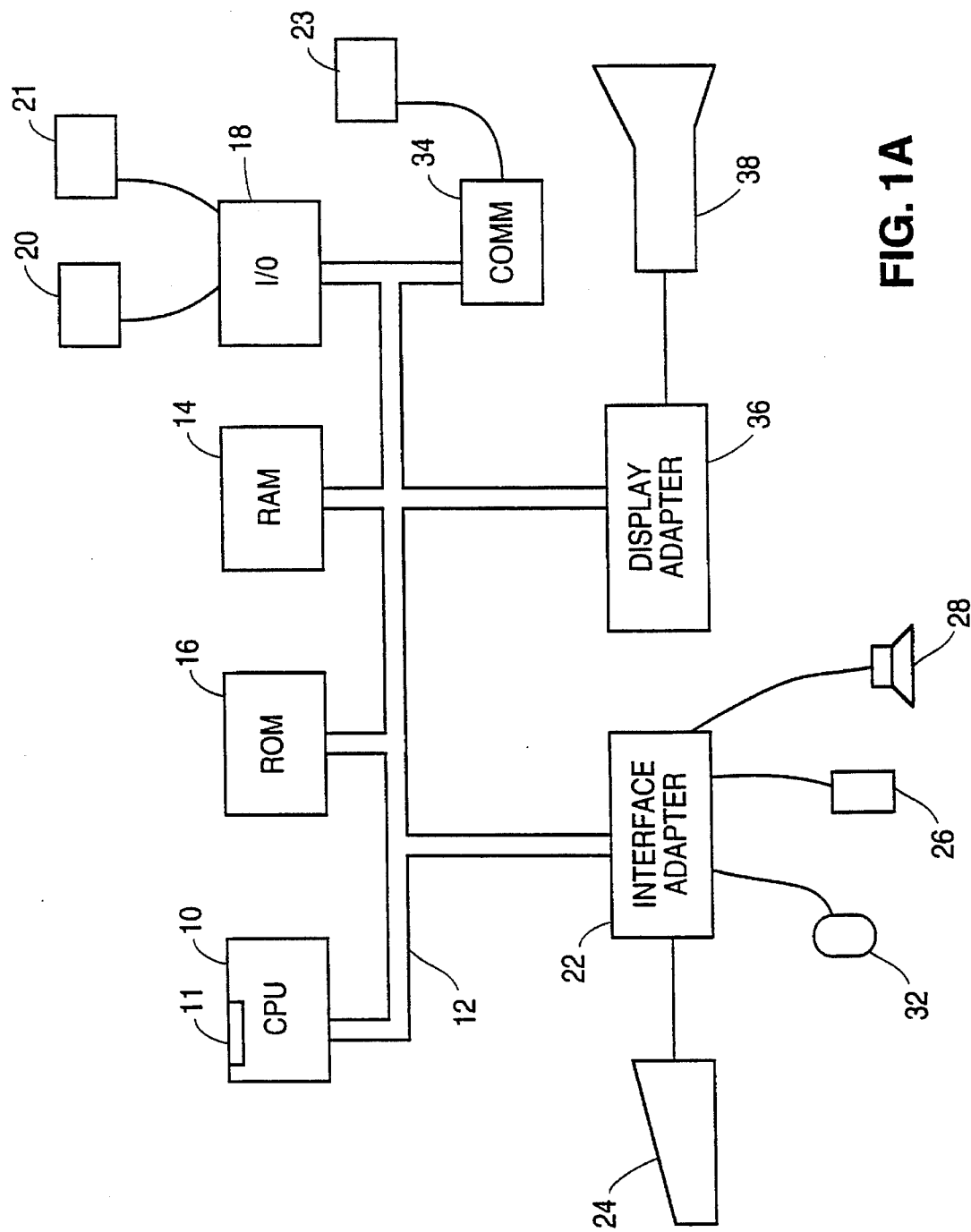
FIG. 1A is a block diagram of a personal computer system in accordance with at preferred embodiment.

The invention is preferably practiced in the context of an operating system resident on a personal computer such as the IBM® PS/2® or Apple® Macintosh® computer. A representative hardware environment is depicted in FIG. 1A, which illustrates a typical hardware configuration of a workstation in accordance with the subject invention having a central processing unit 10, such as a conventional microprocessor, and a number of other units interconnected via a system bus 12. The workstation shown in FIG. 1*a* includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7 ® operating system.

Figure 1B:
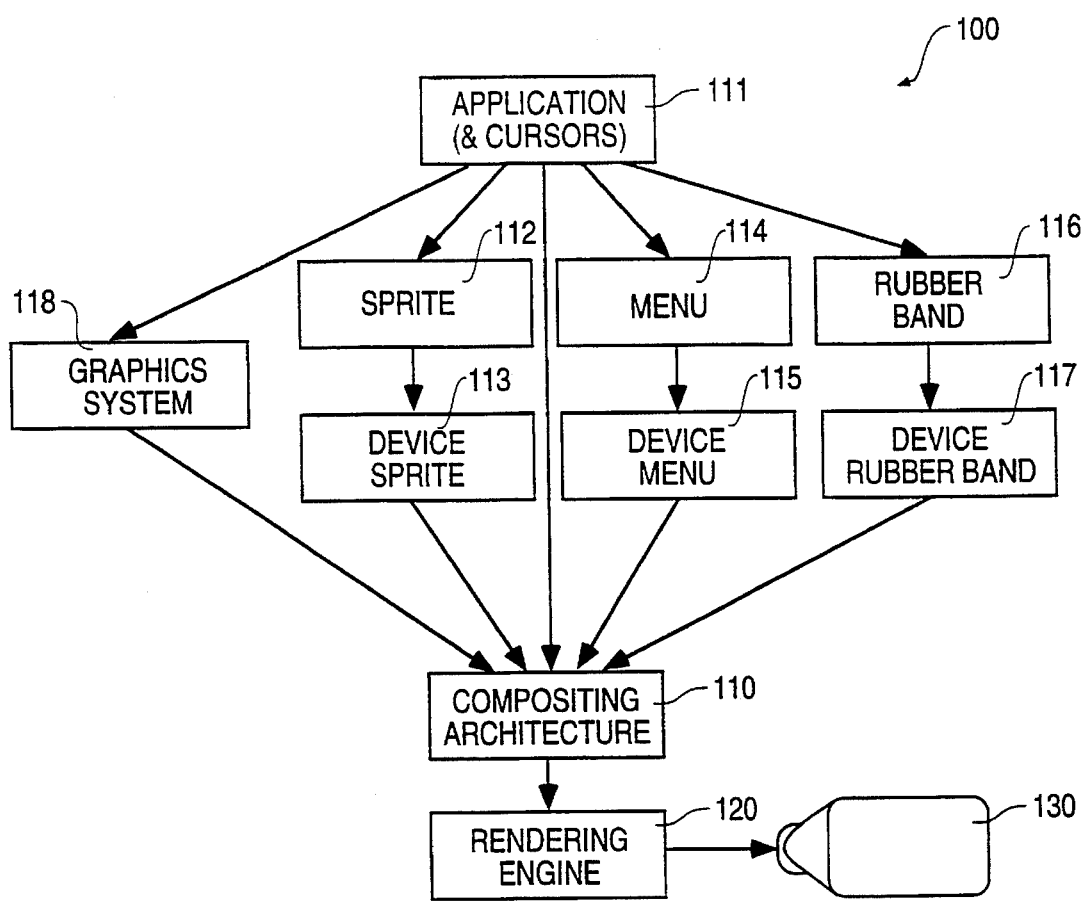
FIG. 1B is a schematic diagram of a data processing system in accordance with a preferred embodiment.

Referring now to the drawings, and more particularly to FIG. 1B, there is shown a schematic block diagram of a data processing system 100 including the invention 110. Within the data processing system 100, one or more applications 111 may be running concurrently for the performance of desired operations on stored or input data. For purposes of illustration, it is assumed that application 111 accepts inputs from positional input devices (often referred to as graphics input devices) such as a mouse, trackball, tablet, light pen, joystick, data glove or the like and provides control of graphics features to be displayed insofar as such graphic features may be supported by the hardware of the system or software of the application. For example, it is assumed that the application can directly control the display of input text and at least a main cursor image having at least a basic or default shape.

Graphic display enhancement features such as sprites 112 (with which cursors are preferably implemented), menus 114 and rubber bands 116 may be provided by the application or as part of the system or a combination of both. Likewise, the system or the application will provide an association of each such feature with at least one graphic input device (e.g. mouse, light pen, data glove, etc.) for control thereof, as depicted at 113, 115 and 117, as well as particular display devices on which such features will be rendered. The outputs thus provided are preferably device-dependent, that is, optimized in accordance with the manipulations which may be performed with the feature and the display device on which it will be rendered, to allow for different kinds of display acceleration to be employed.

It is also assumed that the application can control the generation of graphic images of objects as illustrated by graphics system 118. The objects processed by the graphics system 118, display objects which may have been drawn with cursors or by the application itself which must be included among other items which may require compositing. Thus, the data processing system 100 includes a plurality of sources of data for control of the display which must be combined in some way to provide a display value for each pixel of display 130 by rendering engine 120 while achieving high speed and correct rendering of displayed items. To provide immediate response to user action, generation of each composited item is likely to be asynchronous with the generation of other composited items and should be redrawn and available for display within one or a very small number of display frames. Since any thread in an application can update its part of the screen asynchronously, it is not easy for a different thread to consistently and accurately display a graphic on top of a part of the screen occupied by an item generated by another thread. Accordingly, the invention provides a compositing architecture 110 in which both the item attributes such as transparency or translucency and item priority may be combined for a plurality of items and made available at high speed to the rendering engine and in such form that correct rendering of the data and attributes can be correctly made, without proliferation of memory requirements.

The compositing architecture of the invention performs compositing operations by intercepting pixel values at or in the low level rendering pipeline and routes then to beneath buffers from which they can be recalled when an occulting item moves to obtain fast display response. A strategy based on dynamic painter instantiation is used to minimize rendering time. Storage is minimized by providing for dynamic creation and deletion of beneath buffers together with performing compositing only in small areas of the display where intersecting items which can be expected to frequently change are found. In other cases, traditional clip and update strategies are used. The search for occulted items is also simplified and expedited by separating beneath buffers into groups and provision of pointers to truncate the search.

Figure 2:
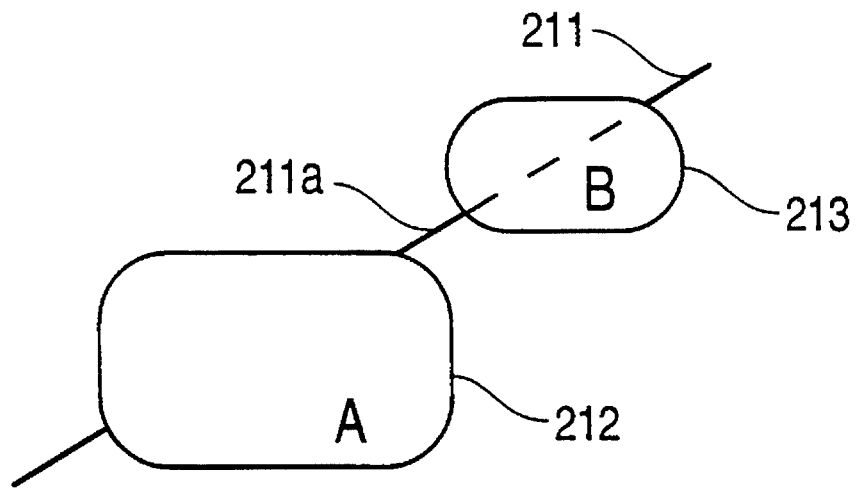
FIG. 2 is a pictorial representation of an exemplary compositing problem in accordance with a preferred embodiment.

FIG. 2 illustrates an elementary but yet difficult compositing problem in forming a computer generated image on screen 130 of FIG. 1. When line 211 is being drawn underneath two composited items 212 and 213, here shown as an opaque sprite B and a transparent sprite B, respectively, pixels in the middle (211*a*) and ends of the line must be drawn on the screen. The shapes of sprites A and B and features of the line (e.g. width) as well as the attributes thereof are preferably determined in accordance with a class of objects which contain information to control rendering but are not otherwise important to the compositing architecture in accordance with the invention. The pixels representing line 211 (or background) under opaque sprite A are preferably redirected to a special buffer referred to as a "beneath buffer" so that they may be rapidly recalled when Sprite A is moved or deleted from the image. The pixels under semitransparent sprite B are preferably redirected as well, but they must also be composited in the rendering pipeline with the image of sprite B and redrawn to the screen 130.

To accommodate compositing of semi-transparent items, including drop shadows, two determinations must be made for at least some of the image items: for particular screen locations, it must be determined if an item is occulted by a higher level (e.g. higher priority layer) item and if any higher level item is opaque. This process and the hardware or software implementing it may be truncated as will be discussed below. If an item exists at a particular screen location, and is not occulted by (e.g. has another object floating over) that portion of the item, as may be determined by rapidly executed numerical position and layer number comparison, the information may be fed more or less directly to screen memory. If an item exists at a location and is occulted by a higher level item at that location, the image values are intercepted. The intercepted image values for the item (which are arbitrary at any location therein and can be animated or otherwise changed with time) are then routed in accordance with a test to determine if any higher level item is opaque. Specifically, if no higher level item is opaque, the image values are placed in an ordered stage of the rendering pipeline as well as a beneath buffer for that item for rapid recovery of image values when an occulting item is moved or deleted.

It should be noted in this regard that it is preferable to truncate item processing when an item is occulted by another opaque item which is not expected to be moved frequently and the image values of the item, itself, are relatively static over time. Thus, processing of the occulted item can be omitted while that item is occulted and image values retrieved from the special buffers as the item emerges from below the occulting item (and many data processing cycles prior to when recalculated display values for the item would be available) By the same token, buffers corresponding to items occulted by more than one item, at least one of which is relatively static or not under active control, can usually be omitted and the number of such special buffers dynamically altered in accordance with the invention. While these save, retrieve and render operations must be synchronized with other rendering or drawing in the region, this is accomplished easily by known methods based on screen or window position.

It should be further noted that the image rendering pipeline need not be a single, multi-stage pipeline. If, for example, only one item was present at a given window or screen location, the pipeline could be an essentially degenerate pipeline allowing more or less direct writing to the screen memory as discussed above. Also, once an opaque item is found, no further inputs to stages of the pipeline (e.g. from lower level items) are applied thereto but, rather, intercepted and routed to the special buffers. This is important since the number of stages actually used in the rendering pipeline determines the amount of time required for a correct rendering to be produced. Therefore, it is an important feature of the invention that the invention provides for selection of and application of image values to one of a plurality of painter circuits which include pipelines of differing lengths in order to optimally process the data representing an item and all higher level transparent items, as will be more fully discussed below.

The rendering of items occulted by higher level items, in accordance with the invention, is greatly simplified from known systems by arranging the architecture of the compositing subsystem such that the checking for items at higher levels is essentially the converse of the rendering operation; routing image data to a rendering pipeline or an off-screen store in dependence on the opacity or transparency of overlying items or window or feature areas.

Ordering rules for compositing, in accordance with the invention are based on the fundamental principle that there is a strong connection between a cursor and the item it is operating on. For example, an item that is being dragged has a strong connection to the cursor that is dragging it. No other object is allowed to display between the cursor and the dragged item (not even another cursor). Likewise, a menu has a strong connection to the cursor that activates it.

This is different than Macintosh® System 7.0. On that system, when the user drags a background window using the command key, an outline is displayed which is clipped by foreground windows. The outline completely disappears when a small background window is dragged underneath a large foreground window. In contrast, the preferred behavior of the environment in which the present invention is implemented provides for reordering of layers and thus does not allow the user to lose sight of the object he is manipulating.

In the preferred applications and environment for the invention, multiple cursors can be driven by multiple input devices (these are called device cursors), or by a remote user across a network working collaboratively (called remote cursors). Remote cursors come in two types. One is active only within a view of a particular collaborative application, and the other has access to the entire desktop and can move across it in an unrestricted fashion. Multiple cursors have a well-defined depth ordering which can be modified by the user. For example, a cursor driven by the mouse will appear on top of a cursor driven by a data structure, until the user changes this ordering using a control panel. The main cursor is the cursor that the user has selected to be on top of all other cursors (the default is preferably to the system mouse device). Other than this depth ordering, all cursors are equal from the view of the compositing architecture.

Figure 3:
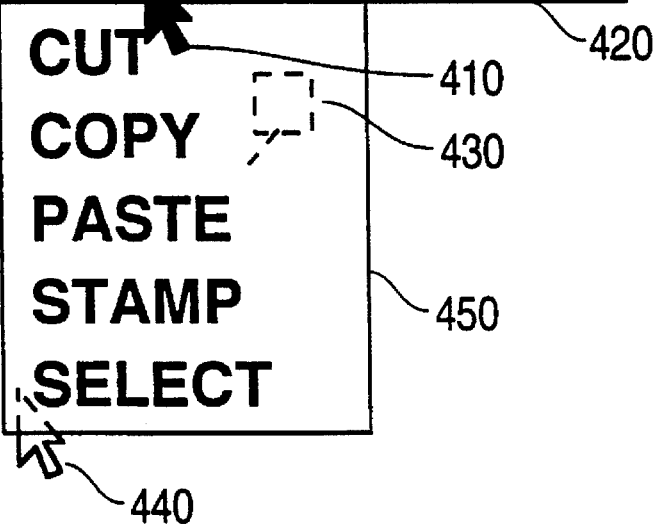
FIG. 3 is a pictorial representation of a pull-down menu illustrating how the menu can obscure a lower cursor in a multiple cursor operating environment in accordance with a preferred embodiment.

The main cursor is the device cursor that the user has determined will be on top of everything. Nothing ever obscures the main cursor. It is flicker-free, tear-free, and pins to the boundaries of the desktop. For example, in FIG. 3, the top or main cursor 410 pulls down a menu 450 from a bar 420 containing menu labels, generally provided across the top of an application screen or window. Note that the menu 450 obscures lower cursor 430 and partially obscures the lower cursor 440. The relative levels of cursors 430 and 440 is unimportant since main cursor 410 is given highest priority and no other item is permitted to intervene between a cursor and the item the cursor (in this case, the main cursor) is to manipulate.

Menus and help balloons are candidates for compositing support because they appear on top of all windows which may be drawing asynchronously and their contents, and must disappear quickly. The only way to make a menu disappear quickly is to buffer the contents of the screen underneath it. However, simply buffering a portion of the screen contents would eliminate the possibility of change of the region while the menu was displayed. Such buffering, nevertheless, can be accomplished without freezing all activity underneath the menu by use of the compositing architecture of the present invention which intercepts current screen information for buffering.

The depth ordering of menus with respect to other composited items is determined by the depth ordering of the cursor that activated it. Menus are different from cursors, however, in that the image of the menu (rather than the location) must change quickly in response to user actions (e.g. different items highlighted as the user passes the cursor over them). Menu pixels (including pixels for animation within balloon help objects) may be retrieved from the display buffer and no special buffer need be provided or generated when the menu or a portion thereof is selected or when obscured by a cursor. However, since a menu must disappear quickly, provision or generation of special buffers for at least some lower level items (which may extend beyond the window) is preferred. Again, nothing is allowed to interpose between a cursor and the menu on which it is operating.

The visual effects of dragging are different in different situations. Sometimes the location of an item is simply being adjusted, and the final appearance of the item should be simulated during dragging as closely as possible. In this situation, it is desirable to use a solid representation of the dragged item that is properly obscured by overlapping objects. In another situation, the dragged item must be dropped on a relatively small target. To avoid obscuring the target, a translucent, outline, or iconified representation of the dragged item is a better choice and which can be readily implemented by sprites.

Figure 4:
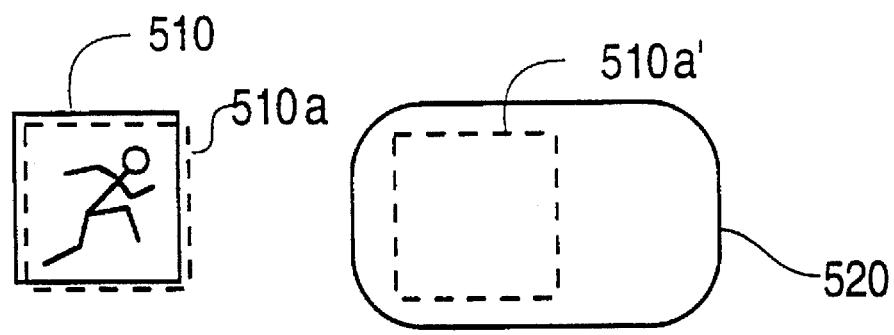
FIGS. 4 and 5 are pictorial representations of graphics objects showing a sprite being dragged under other graphic objects by a user-controlled cursor in accordance with a preferred embodiment.

A dragged item is preferably displayed either as an outline or a solid sprite, depending on the type of dragging interaction. Solid sprite more closely represent the final appearance of the image but outlines allow easier acquisition of targets underneath the sprite. In accordance with the invention, a sprite 510 can be displayed as an outline 510a or as a translucent sprite as shown in FIG. 4 and the manipulation performed on the basis of the outline. This is not an inherent capability of sprites, but can be accomplished simply, in accordance with the invention, by setting the sprite's graphic to any outline graphic either upon initiation of the dragging operation or when an occulting object is detected, and possibly in a different level for purposes of compositing.

When dragging, the outline is displayed underneath the cursor (e.g. by converting the sprite to an outline "item" which is displayed in a level adjacent to the level of the cursor), and is not clipped by items intervening between the cursor and the sprite. In comparison, a solid sprite may be clipped, as in previous techniques, when occulted by item 520 as the sprite is dragged, and the outline 510a' would not be visible to a user. It is also preferable, when a solid sprite at an arbitrary level is dragged, to create a surrogate object at a level immediately below the cursor to assist in determining regions where clipping should be done without compositing. If this is done, the detection of the surrogate overlapping an object between the surrogate and the solid sprite will define the region of the solid sprite to be clipped.

Figure 5:
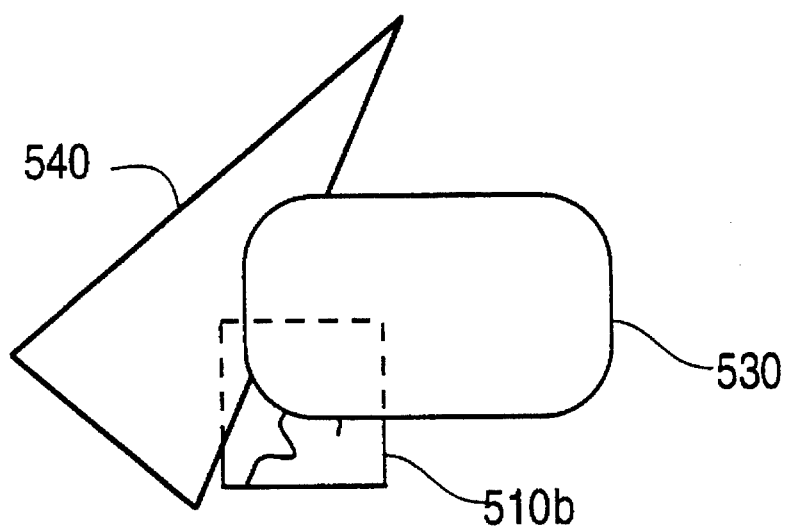

It is also possible to combine the first two modes; (i.e., solid clipped plus outline) by use of the present invention. A solid representation of the sprite 510*b* is shown in FIG. 5 except where the sprite is clipped in accordance with the surrogate object by overlapping objects 530, 540. Where clipping occurs, an unclipped outline is shown on top by substituting an outline sprite graphic for the solid sprite in accordance with the surrogate object at a higher level in the region where compositing is done. In the portion of the sprite which is not occulted, compositing is not required and the original graphic may be used especially for rapid restoration of the clipped region. This simulates the "physical" feel dragging a solid graphic but also gives the user information about position and shape when the dragged object is obscured. The user can rapidly obtain information in the solid sprite graphic (e.g. modal functionality information), at will, simply by moving the sprite to a position where it will not be fully occulted.

It is sometimes provided, as in Macintosh® System 7.0, that the user is allowed to drag background windows which are then represented as an outline (of which, FIG. 4 is also representative). The outline representing the window is obscured by foreground windows in the same way and for the same reasons that the full window (or sprite) would be. This is confusing when a small window is dragged underneath large foreground windows because the outline completely disappears, just as in the case of the dragging of sprites, discussed above. Windows can be handled by the invention in the same manner as sprites and the confusion is similarly avoided.

In addition to the processing of sprites, however, a moving window or view (which includes both graphic data and control items or "tools") preferably freezes all drawing activity on the screen which allows buffering of previously unobscured areas of the screen and does not significantly increase the response time due to the computational burden of compositing large areas of changing image. However, the use of outlines to represent the borders of the window is preferred to further reduce the computational burden of compositing and to increase responsiveness. Window outlines tend to be large and simple, and are therefore good candidates for special optimization. Rubberbanding, window resizing and screen animation such as window opening and "undo" animation are displayed in the same manner as window outlines.

Figure 6:
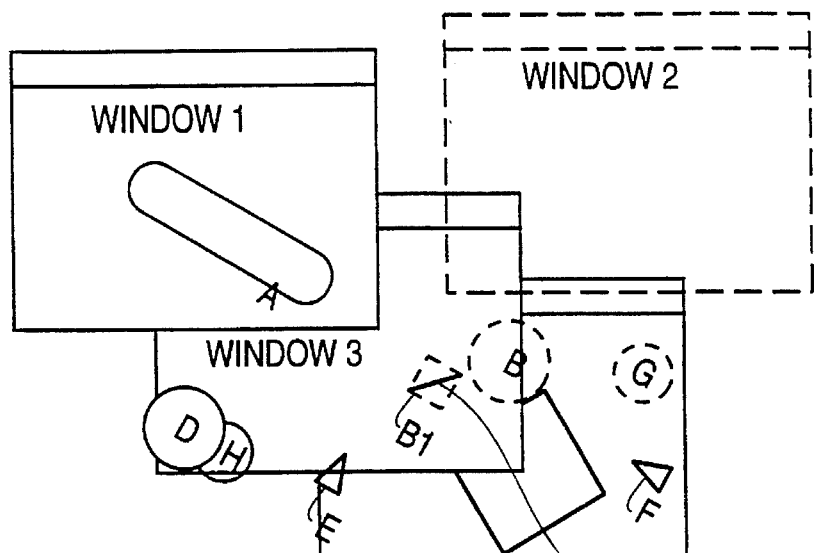
FIG. 6 is a pictorial representation of multiple graphics windows in accordance with a preferred embodiment.

As discussed above, in order to minimize hardware requirements and processing overhead, detection of overlapping or intersecting objects is basic to determination of when compositing will be performed. An implementation of the preferred search strategy in accordance with the invention will now be described. FIG. 6 illustrates an exemplary generalized portion of a display screen. Active drawing at D in window 3 cannot intersect sprite A inside window 1, because window 1 is opaque. It can not intersect sprite C in window 4 either, because window 4 is underneath window 3. Sprite B, however, is inside transparent window 2, which overlaps window 3. Normally, this would make sprite B a candidate for intersection, but in this case, the bounds of window 2 do not intersect the bounds of active drawing at sprite D, so none of its enclosed sprites can intersect. On the other hand, line 650 does intersect transparent window 2 and compositing should be done for line 650 with the transparent window.

Figure 7:
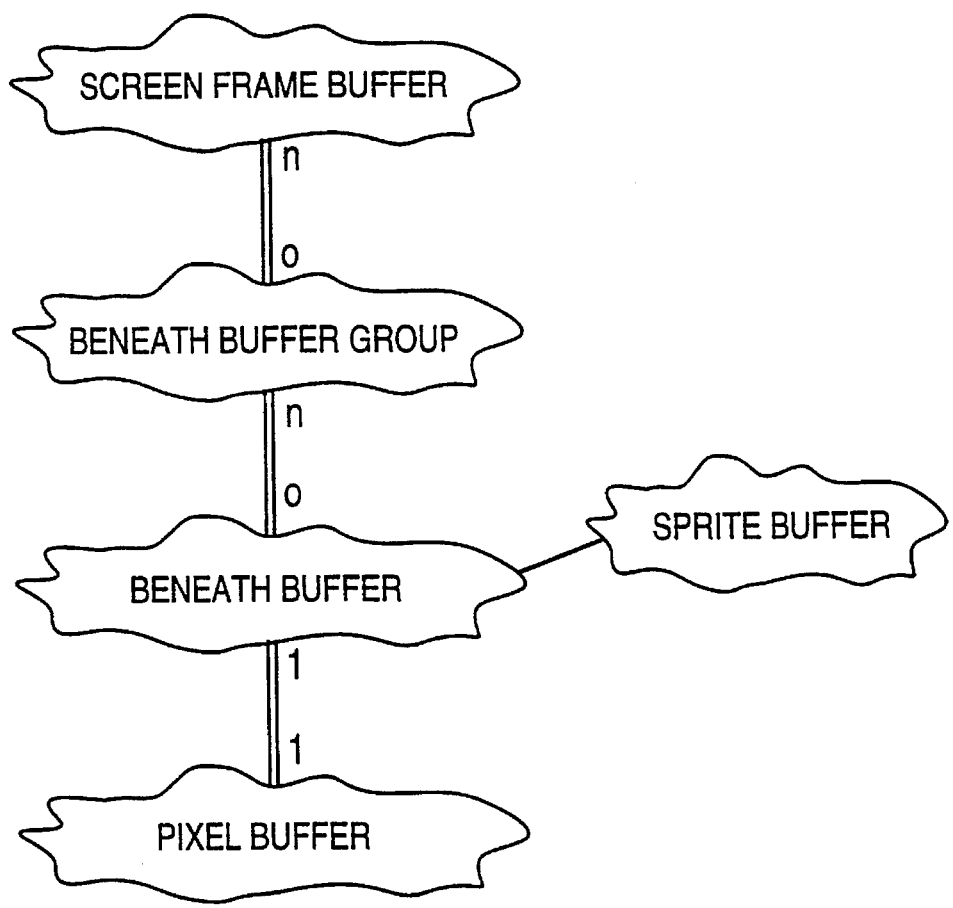
FIG. 7 is a block diagram illustrating how pixel buffers are used to buffer pixel values in frame buffer devices in accordance with a preferred embodiment.

The preferred search strategy is implemented by grouping composited items within a view or window to facilitate intersection testing and window reordering. For this reason, it is useful in the practice of the invention to provide a beneath buffer group class of objects (or BBG, for short) subclassed from screen frame buffers. A BBG maintains a list of beneath buffers associated with composited items inside a particular window. FIG. 7 illustrates this aspect of the architecture. Pixel buffers are used to buffer pixel values in frame buffer devices. A bounds rectangle 651 (see FIG. 6) can be quickly checked to determine if any of the beneath buffers in the window might intersect active drawing. The list of BBGs is maintained in shared memory by the frame buffer. The shared memory implementation eliminates inter-process communication that would otherwise be required to determine overlapping composited items during each drawing call. The pixel buffer obtains pixel values from the sprite buffer from its beneath buffer when a beneath buffer has been created for a particular sprite.

Clipping and compositing are supported in the beneath buffer base class which contains information regarding how an object or item is to be rendered. Clipping and compositing are mutually exclusive and cannot be unified in a single method call. A particular subclass of beneath buffer will implement either clipping or compositing but not both. The subclass overrides a type of method that allows the compositing architecture to determine whether clipping or compositing is to be used (i.e., which methods to call). A subclass that implements the compositing is called a "compositing" beneath buffer while a subclass that implements clipping is called a "clipping" beneath buffer. Opaque items can use either clipping or compositing, depending on efficiency, but semi-transparent items must use a compositing beneath buffer to achieve the correct result. In addition to these two general types of beneath buffer, subclassing allows for optimized storage and compositing implementation for specific types of composited items. For example, a rubberband may be built on a special beneath buffer subclass that is suited to the sparse and dynamic nature of rubberbands.

In FIG. 6, an application wishes to draw a line 650 in window 3, which is underneath opaque window 1 and semi-transparent window 2. There are eight composited items (sprites A–H, in this case) which might overlap the line to be drawn. For the sake of efficiency, intersection tests are performed against only those sprites that can actually intersect. Sprite C can not intersect, because it is contained in window 4, which is underneath window 3. Sprite A can not intersect, because it is contained in opaque window 1. Intersection tests must be performed against sprites D, E and H, which are in the same window as the line 650, sprites B and G, which are in transparent window 2, and sprite F, which is a desktop sprite.

Figure 8:
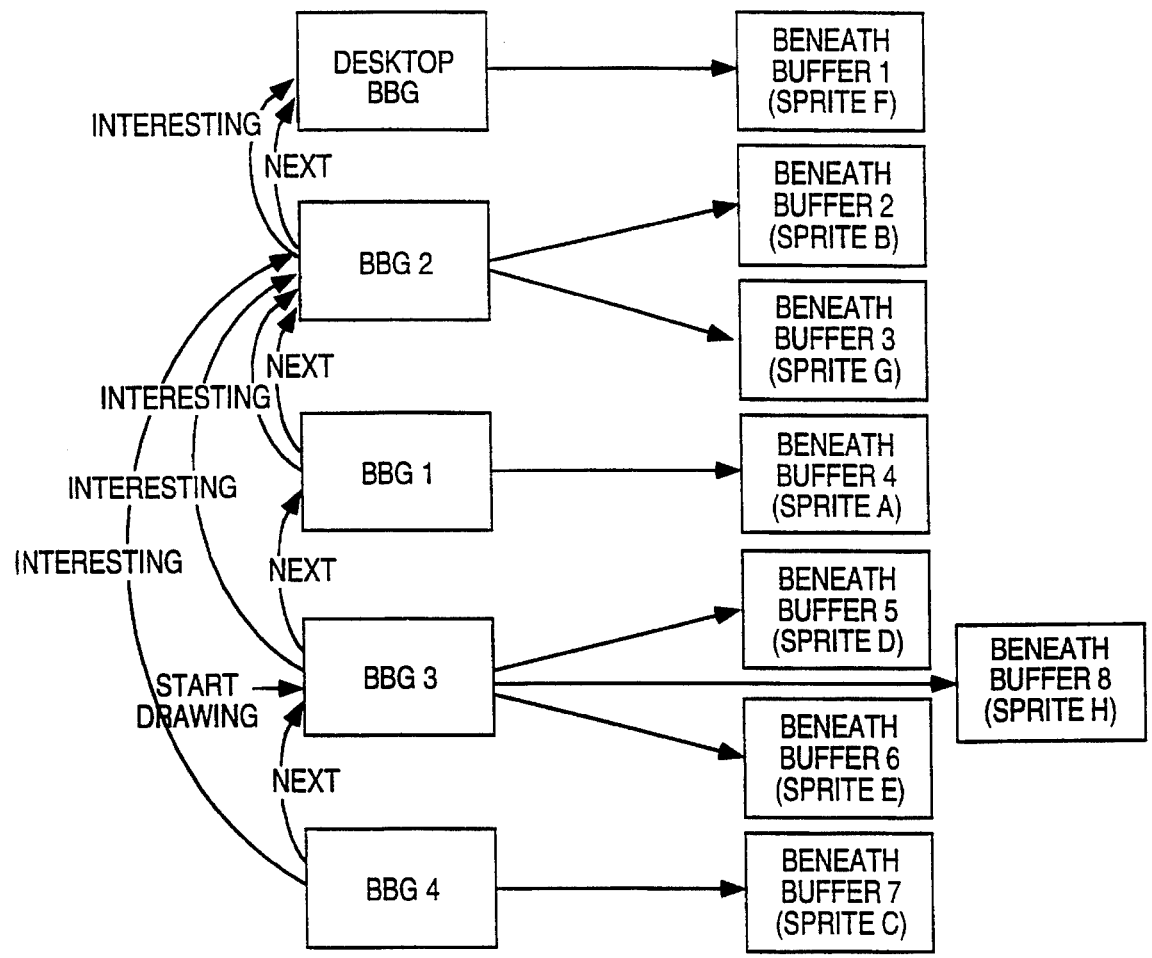
FIG. 8 is a block diagram showing the relationship of TBeneathBufferGroups (BBGs) in the practice of the invention.

FIG. 8 shows the corresponding list of BBGs. Each BBG maintains a list of beneath buffers (as indicated by the 0 and n cardinality designations in FIG. 7) corresponding to the composited items contained within a particular window or view. Each BBG also has at least two pointers to the next BBG and the next interesting BBG. An "interesting" BBG is one that might contain sprites that can intersect drawing in lower layers. Between BBG1 and BBG2, for example, these pointers are the same because window 1 and window 2 do not intersect. Opaque BBGs are never interesting, because rendering in lower layers does not affect them or their enclosed composited items. Further, to facilitate intersection testing, each BBG in the list shown in FIG. 8 has pointers to point to their beneath buffer(s).

Before drawing of line 650 begins, intersection tests are performed starting in BBG 3 as depicted by a dashed arrow. Sprites in lower layers can be safely ignored for intersection. Beneath buffers 5, 6 and 8 are tested for intersection. Next, the interesting BBG pointer is traversed to BBG 2. This prevents useless tests in BBG 1. Since the bounds of BBG 2 intersect the bounds of the line we wish to draw, all composited items within BBG 2 must be tested. Therefore, intersections tests are performed against beneath buffers 2 and 3. Finally, the interesting BBG pointer is traversed to the desktop BBG. The bounds of the desktop BBG cover the entire device, so it also intersects the bounds of the line and an intersection test is performed against beneath buffer 1.

Before any pixels can be painted, a painter (TPainter) must be created based on a particular paint operation (which specifies color, transfer mode, and pattern). To accommodate the synchronization requirements of the compositing architecture, a renderer must obtain a painter through a stack-based object called TDrawingLock. TDrawingLock is simply a stack-based wrapper which only exists for the purpose of recovering resources during exception processing. Before a primitive is rendered, the renderer must execute code such as:

TDrawinglock myLock (thePaint, deviceCache);

TDrawingLock gets a simple TPainter object by asking deviceCache for a painter that corresponds to thePaint. The device cache may already have an appropriate TPainter in its cache; otherwise, it creates one.

After the TDrawingLock is created, the renderer is free to do any sort of preparation or computation it wants. The lock is not actually acquired until the renderer is ready to paint some pixels. At this point, the renderer needs to call methods on a TPainter object, but it does not have one yet. It gets one by asking the lock for one. The lock method preferably first locks down an area of a shared frame buffer for exclusive access by this rendering task. No sprites, composited items, or other drawing tasks are allowed to interfere during the time this lock is acquired. Second, the lock method preferably creates a dynamic painter which can accomplish any necessary compositing operations that may be needed to render underneath an overlapping composited item.

The renderer determines the bounding rectangle of the area it wants to modify (this might be as simple as the bounds of the entire primitive, or may be a sub-rectangle that covers only the next few painter calls), and passes this to the lock method object. The lock may decide to grant only a portion of this request, however. It returns the Y coordinate of the last scan line that the renderer is allowed to access without reacquiring the lock.

Figure 9:
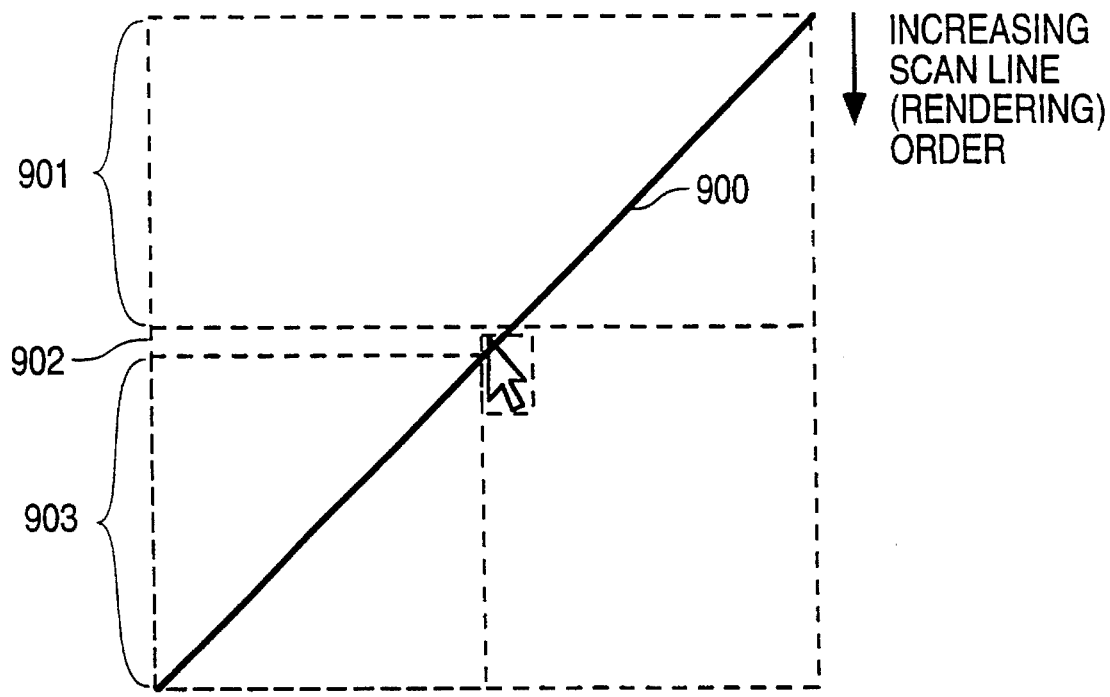
FIG. 9 is a pictorial representation of a long diagonal line intersecting a cursor to illustrate the use of dynamic painters in accordance with a preferred embodiment.

This feature of the invention allows the drawing lock to return different painters depending on the presence of composited items. For example, consider the situation shown in FIG. 9. A long diagonal line 900 intersects one pixel of a cursor. If the drawing lock were only allowed to return one painter corresponding to the entire bounding rectangle of the line, it would have to return a very expensive painter for the whole thing. Instead, the lock can return a direct painter (effectively overriding compositing) for the subrectangle labeled 901 which contains only a portion of the line. The renderer renders the portion of the line in rectangle 901, then tries to acquire the lock for the remainder of the bounds rectangle or a bounds rectangle of the remaining portion of the line. If the cursor has not moved in the meantime, the lock returns a compositing painter, and a changed Y value that will ensure that the expensive painter is used on as small an area as possible (subrectangle 902 which contains a single combination of objects: the line and the cursor). Finally, the renderer will acquire the lock for a third time, and will get a direct painter for subrectangle 903, which, like rectangle 901 contains only the line. This type of operation provides a very great reduction in processing speed when only a few pixels require compositing and is preferably provided as a special case process which is optimized for single pixel compositing (e.g. for the hot spot of a cursor).

Objects in the screen frame buffer class provide a method which returns an iterator over all composited items that intersect a given bounds rectangle:

TBeneathBufferIterator MScreenFrameBuffer::CreateBeneathBufferIterator (const TLongRect& bounds, const TGrafState& );

This call creates an iterator which iterates over all beneath buffers that overlap the bounds rectangle, or it returns NIL if no intersecting beneath buffers are found (this is a speed optimization to avoid creation of empty iterators). The TGrafState parameter contains a pointer to the BBG corresponding to the current window. Composited items in windows beneath this window can be safely ignored.

If CreateBeneathBufferIterator returns NIL, a command to start drawing of an object (StartDrawing) returns a simple painter, and the renderer uses it to draw directly on the screen. If the pointer returned by CreateBeneathBufferIterator is a non-NIL pointer, the iterator interface becomes useful. The list of intersecting beneath buffers must be traversed forwards and backwards during subsequent processing. The iterator (TBeneathBufferIterator) optimizes subsequent traversals by eliminating all nonintersecting beneath buffers from consideration. A painter is returned that implements the dynamically chosen compositing strategy of clipping or compositing.

The renderer proceeds to draw the primitive with the painter which was returned. When it is finished, the renderer calls for release of the drawing lock. This allows the compositing architecture to finalize compositing operations, transfer the results to the screen, permit sprite movement, and possibly delete the compositing painter and associated data structures.

Figure 10:
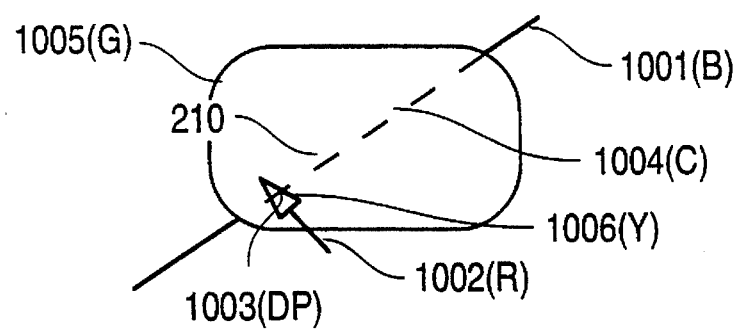
FIG. 10 is a pictorial representation showing dragging of a semi-transparent green object using a semi-transparent red cursor in accordance with a preferred embodiment.

As an example of the operation of the invention, if multiple compositing beneath buffers intersect the bounds of the primitive to be rendered, as shown in FIG. 10, the composited items may overlap each other, requiring multiple compositing steps and beneath buffer updates to achieve the correct results. In FIG. 10, a user is dragging a semi-transparent green object 1005 using a semi-transparent red cursor 1002. Coincidentally, a separate thread decides to draw a blue line 1001 underneath the current position of the dragged object 1005. The user should see blue pixels where the line does not intersect the sprites, cyan pixels where (1004) it intersects the green object, and dark pink pixels where (1003) it intersects both the green object and the red cursor. The transparent red cursor appears yellow (1006) where it overlies the green object being dragged.

In this situation, the drawing lock will force the renderer to draw the line in short segments. One segment might be drawn directly to the screen using a simple painter, another segment will use a short pipeline painter (where the line is only obscured by the green sprite), and a more expensive multiple object compositing painter will be used where the line is obscured by both objects.

A painter for multiple object compositing creates a buffer that is the size of the intersection of bounds rectangles. It copies the screen contents into the buffer, and then "unwinds" the contents by copying the contents of each composited item beneath buffer into the buffer. Eventually, it has constructed an image of the screen pixels underneath all composited items. The renderer now draws the line segment into this buffer. The StopDrawing method causes each composited item to be recombined into the buffer, and the final result is flushed to the screen.

The TBeneathBufferIterator provides a useful interface to perform the top to bottom list traversal to "undraw" composited items, as well as the bottom-to-top traversal during recompositing. FIG. 11 illustrates how this works when two opaque composited items intersect active drawing. In FIG. 11, an opaque cursor is dragging an opaque star-shaped object when a line must be drawn underneath both. In step A, shown in FIG. 12A, a new compositing region is allocated corresponding to the bounding region 1104 of FIG. 11. Next, in FIG. 12B, the shape region from the star object is merged into the compositing region (step B). Pixels in this part of the compositing region point to a simple painter that paints into the star's beneath buffer. In FIG. 12C, the shape region belonging to the cursor is merged in step C, and these pixels point to a painter that paints into the cursor's beneath buffer. Note that the cursor's shape region is merged into the compositing buffer only in areas that are not already covered by the star's shape region. This is because the star is below the cursor. Where the two overlap, the star's beneath buffer must intercept pixels written by the line before they reach the cursor's beneath buffer. A multiple object clip painter is returned, which intercepts all painter calls and routes them to the appropriate painter as indicated by the compositing region. A single painter call might be divided into multiple painter calls if it affects pixels that are routed to different destinations in the compositing region. When completed, the compositing region is deleted. No further pixel transfers are necessary; the screen and beneath buffers are already up to-date. In Step D, the compositing buffer is deleted.

In view of the foregoing, it is seen that the present invention provides an architecture in which intersections of opaque, translucent and transparent graphic images may be readily detected and correctly rendered even when the overlapping regions are changed at high speed. The invention dynamically minimizes hardware storage requirements and dynamically optimizes rendering speed while supporting multi-tasking and multiple window display.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An image compositing method comprising the steps of:
    (a) generating image data corresponding to each of a plurality of items, each item having a level;
    (b) detecting intersections of respective ones of the items;
    (c) intercepting image data corresponding to an item having a comparatively lower level in response to the step of detecting intersections; and
    (d) redirecting the image data intercepted by the step of intercepting image data to a dynamically selected one of at least two painters, at least one of the at least two painters being optimized for drawing a particular number of images which are detected to be intersecting at a location.

2. A method of generating a composite graphic image from a plurality of overlapping opaque and non-opaque graphic images, each of the plurality of graphic images being included in one of a plurality of groups, and within a group, the graphic image being displayed at a depth level which determines a visual distance of the graphic image from a viewer relative to other images of the group, each of the plurality of groups being associated with a group level indicative of a visual distance of the each group from the viewer relative to the other groups, the method comprising the steps of:
    (a) selecting an active image from the plurality of graphic images and determining one of the plurality of groups in which the active image is located;
    (b) determining whether the active image intersects graphic images located in the one group and having a higher depth level;
    (c) determining whether graphic images in any of the plurality of groups having a higher group level than the one group intersect the active image; and
    (d) combining the active image with all intersected non-opaque images to generate the composite graphical image including the step of locking a region of the active image defined by the smallest intersection of the active image and an intersecting image to minimize the amount of image data which is locked.

3. The method of claim 2 further comprising the step of:
    (e) dynamically creating a beneath buffer object for each of the plurality of graphic images from a buffer subclass of a common base class and a beneath buffer group object for each of the plurality of groups, the beneath buffer object being linked to a beneath buffer group object for which the the group includes each graphic image and having a depth order indicative of the image depth level.

4. The method of claim 3 wherein step (e) further comprises the step of:
    (e1) creating a beneath buffer group object for each of the plurality of groups, the beneath buffer group object for a group including pointers to beneath buffer objects included in the group to provide the links for the beneath buffer objects included in the group.

5. The method of claim 4 further comprising the step of:
    (f) creating a pixel buffer object from which pixels are rendered from a pixel subclass of the common base class; and
wherein step (d) comprises the step of:
    (d1) combining the active image with the intersected images and depositing the combination in the pixel buffer object.

6. The method of claim 5 wherein the common base class comprises a virtual method and step (e) comprises the step of:
    (e2) creating the beneath buffer objects from a subclass which overrides the virtual method in the common base class; and
wherein step (f) comprises the step of:
    (f1) creating the pixel buffer object from a subclass which overrides the virtual method in the common base class so that depositing combination data in the pixel buffer object dynamically selects a beneath buffer object or a pixel buffer object depending upon a type defining the image data, so as to allow beneath buffer objects to intercept the image data.

7. The method of claim 6, wherein the region is defined by the smaller of two common dimensions of the active image and the intersected image.

8. The method of claim 3 wherein one of the plurality of graphic images is a cursor image and the method further comprises the steps of:
    (f) creating a surrogate image object to represent the active image which surrogate image object has a depth level one level below the depth level of the cursor image,
    (g) determining whether the surrogate image intersects other images in accordance with steps (b) and (c) and
    (h) clipping the portion of the active image defined by the intersection determined in step (g) and combining the remaining portion of the active image in accordance with step (d).

9. Apparatus for generating a composite graphic image from a plurality of overlapping opaque and non-opaque graphic images, each of the plurality of graphic images being included in one of a plurality of groups, and within a group, the graphic image being displayed at a depth level which determines a visual distance of the graphic image from a viewer relative to other images of the group, each of the plurality of groups being associated with a group level indicative of a visual distance of the each group from the viewer relative to the other groups, the apparatus comprising:

(a) means for selecting an active image from the plurality of graphic images and means responsive to the selection of an active image for determining one of the plurality of groups in which the active image is located;

(b) first means responsive to the plurality of graphic images for identifying graphic images located in the one group and having a higher depth level which intersect the active image;

(c) second means responsive to the plurality of graphic images for identifying graphic images in any of the plurality of groups having a higher group level than the one group which intersect the active image and including means for locking a region of the active image defined by the smallest intersection of the active image and an intersecting image to minimize the amount of image data which is locked; and (d) means responsive to ones of the plurality of graphic images identified by the first and the second identifying means for combining the active image with all intersected non-opaque images to generate the composite graphical image.

10. The apparatus of claim 9 further comprising:

(e) means responsive to the plurality of graphic images for dynamically creating a beneath buffer object for each of the plurality of graphic images from a buffer subclass of a common base class and a beneath buffer group object for each of the plurality of groups, the beneath buffer object being linked to a beneath buffer group object for which the group includes each graphic image and having a depth order indicative of the image depth level.

11. The apparatus of claim 10 wherein the beneath buffer object creating means further comprises means responsive to the plurality of beneath buffer groups for creating a beneath buffer group object for each of the plurality of beneath buffer groups, the beneath buffer group object for a group including pointers to beneath buffer objects included in the group to provide the links for the beneath buffer objects included in the group.

12. The apparatus of claim 11 further comprising means for creating a pixel buffer object from which pixels are rendered from a pixel subclass of the common base class; and means responsive to the active image and ones of the plurality of graphic images identified by the first and the second identifying means for combining the active image with the intersected images and depositing the combination in the pixel buffer object.

13. The apparatus of claim 3 wherein the common base class comprises a virtual method, the beneath buffer object creating means comprises means for creating the beneath buffer objects from a subclass which overrides the virtual method in the common base class; and the pixel buffer object creating means comprises means for creating the pixel buffer object from a subclass which overrides the virtual method in the common base class so that depositing combination data in the pixel buffer object dynamically selects a beneath buffer object or a pixel buffer object depending upon a type defining the image data, so as to allow beneath buffer objects to intercept the image data.

14. The apparatus of claim 9 wherein the region is defined by the smaller of two common dimensions of the active image and the intersected image.

15. The apparatus of claim 10 wherein one of the plurality of graphic images is a cursor image and the apparatus further comprises:

(f) means responsive to the active image object for creating a surrogate image object to represent the active image which surrogate image object has an depth level one level below the depth level of the cursor image, (g) means responsive to the surrogate image object for determining whether the surrogate image intersects other images identified by the first and the second identifying means; and (h) means responsive to the portion of the active image defined by the intersection determined by the image intersecting means and combining the remaining portion of the active image to generate the composite graphical image.

\* \* \* \* \*